Oct. 23, 1956 R. C. FLETCHER 2,768,322

INTERDIGITAL FILTER CIRCUIT

Filed June 8, 1951

INVENTOR
R. C. FLETCHER
BY Hugh S. Wertz
ATTORNEY

United States Patent Office 2,768,322

Patented Oct. 23, 1956

2,768,322

INTERDIGITAL FILTER CIRCUIT

Robert C. Fletcher, Chatham, N. J., assignor to Bell Telephone Laboratories, Incorporated, New York, N. Y., a corporation of New York Application June 8, 1951, Serial No. 230,570

10 Claims. (Cl. 315—3.5)

This invention relates to space charge devices and more particularly to microwave amplifiers which utilize the interaction between an electron stream and an electromagnetic wave to secure gain for the electromagnetic wave.

It is an object of this invention to improve amplifiers of this type by increasing their power handling capacities and ruggedness without significant sacrifice in gain and broad band characteristics.

In such amplifiers, an electric circuit propagates radio frequency electromagnetic waves therethrough at velocities slower than the velocity of light and an electron stream is projected through the electric field set up by the electric circuit and in the direction of wave propagation. By proper adjustment of the velocities of the propagated wave and the electron stream, the wave and the stream can be made to interact in a cumulative fashion whereby amplification of the wave is realized. In such devices it is important for high gain to utilize a wave transmission circuit which has a high impedance to permit good coupling between the wave and stream. Also for broad band operation, it is desirable that the coupling be substantially uniform over the frequency range contemplated. In both these respects, the helix type circuit is well adapted and consequently it has found wide use as an electric circuit where high gain and broad band operation are the primary considerations. However, the required dimensions of such helix circuits are directly related to the wavelengths in the operating range intended, so that at very high frequencies, very fine and delicate helices become necessary. Difficulty arises with such helices both in construction and assembly. Additionally, helices in general have limited power dissipative characteristics and hence do not lend themselves to high power operation. As a result, it has become customary in devices for high frequency and/or high power operation to employ a so-called filter-type circuit for the wave propagating element. However, the various filter-type circuits known heretofore have usually been characterized either by low impedances which result in inefficient coupling and low gain or by critically resonant elements which narrow the effective operating frequency range. As a consequence, these filter-type circuits are generally not entirely suitable where high gain and broad band operation are important considerations.

Accordingly, it is another object of this invention to provide for incorporation in a microwave amplifier a novel wave circuit structure which has a high impedance for high gain, is essentially without critical resonant elements for broad band operation, has good heat dissipative properties for high power operation, and is rugged for ease of construction and assembly.

To this end, the present invention utilizes a modified linear interdigital filter-type circuit. Interdigital circuits have been used hitherto as wave transmission circuits in devices of this general kind, but in the past the finger elements have been substantially straight, forming a linear array whose main surfaces are planar. For efficient use of such an array, it is necessary to utilize an electron beam which has a flat or rectangular cross section. However, present techniques for forming high density electron streams favor cylindrical streams. Accordingly, for high power operation which necessitates high density streams, it is usually preferable to utilize cylindrical electron beams. For maximum efficiency, it will then be necessary to employ a wave transmission circuit which has a similar configuration since maximum efficiency generally requires that the electron stream flow contiguous to the wave circuit, the region where the useful electric field is strongest.

It is, accordingly, a more specific object to provide an interdigital filter circuit which has a cylindrical configuration for better interaction with a cylindrical stream.

To this end, in an illustrative embodiment, the wave guiding circuit which forms the basis of the present invention comprises a cylindrical conducting base plate within which are positioned a plurality of curved finger elements forming a longitudinal linear array. In this array, alternate fingers are supported from one of two conducting supports integral with the base plate, adjacent fingers extending from a different one of the two conducting supports to form an interdigital pattern. In a preferred embodiment, these curved fingers extend along surfaces coaxial with the cylindrical base plate. Additionally, a plurality of such filters can be combined to form a wave circuit comprising an intercircular array of annular elements.

The invention will be better understood from the following complete description taken in connection with the accompanying drawings in which.

Figures 1, 2, 3, 4:
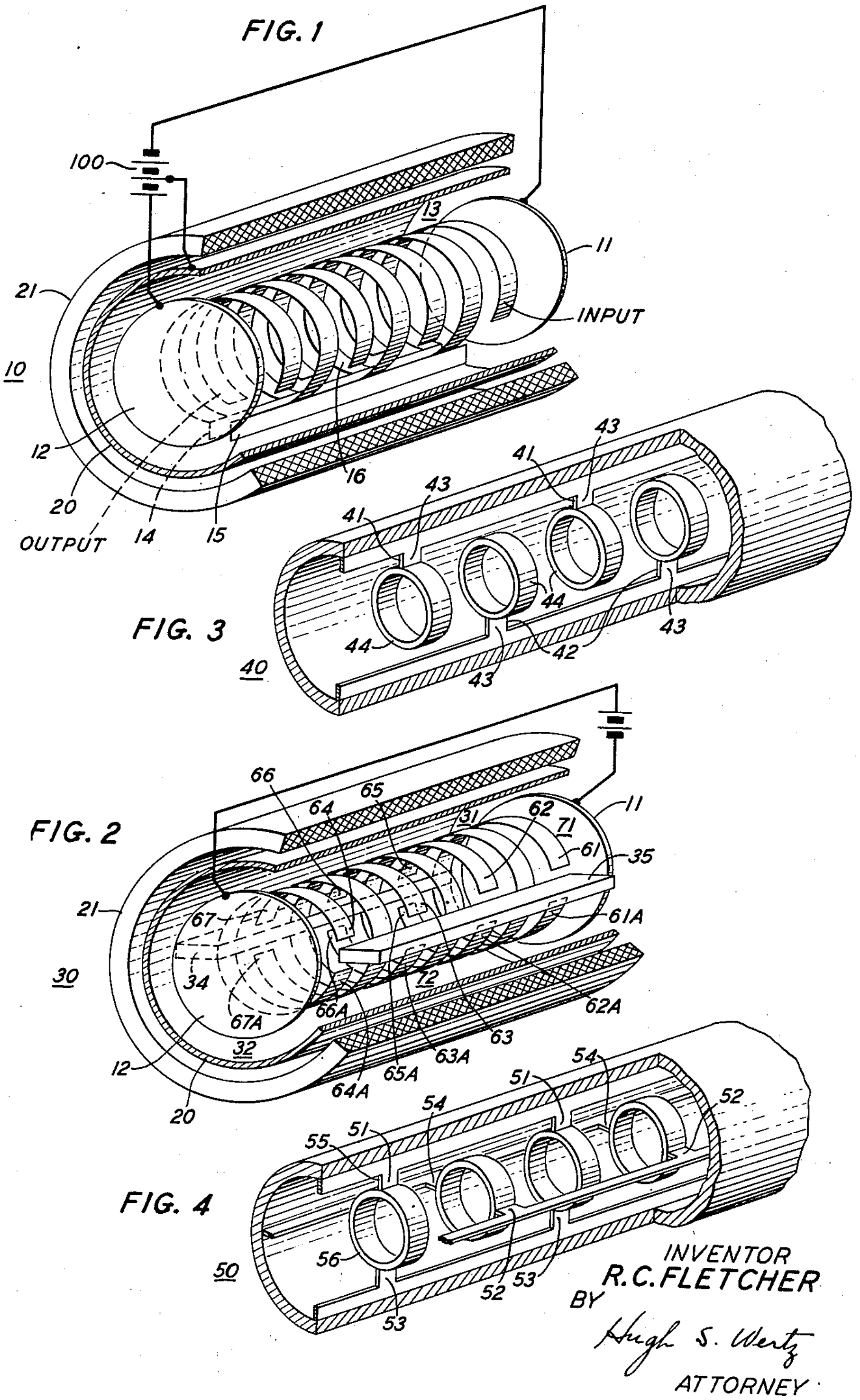
Fig. 1 shows schematically a microwave amplifier which incorporates a wave transmission circuit in accordance with the invention.
Fig. 2 shows schematically a microwave amplifier which incorporates a plurality of wave transmission circuits in accordance with the invention.
Fig. 3 illustrates a tube in which there is incorporated a wave transmission circuit in accordance with the invention which is the equivalent of two parallel circuits.
Fig. 4 shows a tube which uses a wave circuit which is the equivalent of four parallel circuits.

With reference now to the drawings, in Fig. 1 there is shown schematically a microwave amplifier 10 of the traveling wave tube type wherein there is incorporated a wave transmission circuit in accordance with the invention. The various tube elements are enclosed in an evacuated cylindrical envelope 20 which preferably is of a non-magnetic metal such as copper, which permits ruggedness of structure and yet avoids disturbance of the magnetic field customarily used with such devices for collimating the electron stream. In this regard, it is generally advantageous to minimize the use of magnetic materials throughout the tube. Housed at one end of the envelope and insulated therefrom is the electron gun 11, of conventional structure, to provide an electron stream suitable for interaction with the electromagnetic field set up by the wave transmission circuit. Since the most efficient region of interaction is in the region proximate to the wave circuit, it is generally desirable to have the electron stream flow contiguous to the circuit surface. Accordingly, for use with a wave transmission circuit which has a cylindrical configuration, as is characteristic of a preferred embodiment of the invention, the electron gun is adapted to provide a cylindrical beam. For some applications, it may be preferable to utilize a hollow or tubular cylindrical beam instead of a solid beam. Such electron guns customarily include an electron-emissive cathode surface, a heater unit, and various electrodes for collimating and accelerating the stream, none of which have been shown in detail here to preserve the simplicity of the drawing. At the opposite end of the envelope, there is arranged a collector electrode 12 positioned in target relationship with the electron gun for collecting the electrons after their travel through the region of interaction with the electric field. A return path is provided between the collector electrode and the electron gun by way of potential source 100 connected therebetween. Magnetic flux producing means 21 are utilized exterior to the envelope for providing a longitudinal magnetic field between the electron gun and the collector electrode to increase the straightness of electron flow. Intermediate the electron gun and the collector electrode is positioned the interdigital wave transmission circuit 13, disposed to propagate a slow electromagnetic wave in the direction of electron flow. To realize optimum effectiveness from the interdigital structure, the electron stream should flow across as much of the length of each finger element as possible, contiguous to both the upper and lower surfaces thereof. In accordance with the invention, this circuit is an interdigital filter structure which is characterized by curved finger elements. The filter structure includes a conducting base plate, which, in the preferred embodiment here shown, is the tubular cylindrical portion of the tube envelope 20, and two spaced conducting support members 14 and 15 which are integral with and extend longitudinally along the inside of the tube envelope. Alternately fastened to the supports 14 and 15 are the curved finger elements 16 arranged in a linear array and equally spaced along the direction of electron flow. In this illustrative embodiment, alternate finger elements extend from one support almost to the opposite support in paths which lie in a cylindrical surface coaxial with the base plate.

The tube is operated in the manner known for traveling wave tube operation. The electromagnetic wave is applied by suitable input means to the end of the wave circuit nearer the electron gun, or upstream end, and is thereafter propagated along the circuit toward the collector electrode end. The electron gun is simultaneously energized to provide an electron stream flowing contiguous to the linear array of elements and hence through the electric field surrounding the wave circuit. Transverse motion of electrons is minimized by the strong longitudinal magnetic field provided by electromagnet 21. To provide acceleration to the electron stream, the electron source is operated by means of the potential source 100 at a potential negative with respect both to the tube envelope and the wave circuit. This potential is chosen to impart a longitudinal velocity to the electron stream substantially identical with the longitudinal wave propagation velocity so that cumulative interaction may be secured between the electron stream and the traveling electromagnetic wave. At the other end of the wave circuit, or downstream end, the amplified wave is derived by suitable output means for utilization.

In my copending application, filed concurrently herewith, Serial No. 230,569, there is set forth an analysis of the interdigital circuit as a broad-band wave transmission circuit. Therein it is shown that for broad band characteristics, the following characteristics are generally desirable: the spacing between the base plate and the linear array of finger elements is less than the mean separation between adjacent elements of the array; each finger element has a length which is approximately one-quarter the wavelength of the mid-frequency of the operating range; the circuit is operated to provide a phase difference of $\theta$ in the electromagnetic wave between adjacent fingers; and the base plate spacing is adjusted so that $$\frac{d\theta}{df}=\frac{\theta+\pi}{f}$$

where $f$ is the frequency of the electromagnetic wave. Accordingly, in a preferred embodiment, the interdigital wave circuit is constructed in accordance with the teachings set forth in this copending application although the arrangement is operative if these specific relationships are not observed.

Fig. 2 shows schematically a traveling wave tube amplifier 30 which, in order to secure still greater output power, utilizes a plurality of parallel interdigital filters of the kind which features the present invention. For the sake of simplicity, the tube shown utilizes only two such interdigital filters but it will be evident from the following description that additional circuits can be incorporated consistent herewith. In most respects, amplifier 30 is similar to amplifier 10 shown in Fig. 1 and the same reference numerals are used to denote correspondingly similar elements. Amplifier 30 is distinguished by the use of two identical interdigital filters 31, 32 interposed between the electron gun 11 and the collector electrode 12, each being disposed to permit a different portion of the cylindrical electron stream to flow contiguous to its finger elements. In this case, the conducting supports 34 and 35 which extend along the base plate are preferably spaced further apart than their counterparts the supports 14 and 15 in tube 10 of Fig. 1. It is this spacing which in general determines how long the fingers need to be to extend from one support to a point just short of the other. In the case where two filter circuits are used, to preserve the symmetry and for highest efficiency, the supports are arranged diametrically opposite each other. In cases where additional circuits are included, the various supports preferably should be spaced symmetrically around the tube axis. In each filter of this illustrative embodiment, alternate fingers extend in an interdigital pattern from a different one of the two supports almost to the other support along paths which lie in a cylindrical surface coaxial with the cylindrical base plate. In this way, each filter forms a portion of a cylindrical configuration which is coaxial with the base plate.

In general, the same considerations set forth for the construction of the single filter circuit incorporated in the tube shown in Fig. 1 are again here applicable for each of the filters. Accordingly, in a preferred embodiment, the various filters are constructed in accordance with the teachings in my aforementioned copending application.

In operation, the cylindrical electron stream is adjusted to flow contiguous to the resultant cylindrical configuration. In other respects, this amplifier functions in the manner characteristic of traveling wave tube operation.

Fig. 3 shows a wave circuit which is a novel extension, in accordance with another aspect of the invention, of the parallel arrangement of two filter circuits incorporated in the tube shown in Fig. 2. With reference to this latter figure, it can be seen that the two circuits will operate independently except for some slight leakage fields, and that each will have the characteristics of a single interdigital structure. Accordingly, it can be expected that the modes of operation will have the same characteristic phase constant $\theta$ for each. If the tube is operated so that the voltage on the free ends of two corresponding elements such as 61, 61A are the same, then, according to the analysis for such a structure, the voltages will be the same on the free ends of any two corresponding elements such as 62, 62A; 63, 63A, etc. Therefore, it is possible to interconnect the free ends of corresponding elements to form a ring or annular element without affecting the operation of the filter circuit. The principal effect of this interconnection is only to disallow independent operation of the two circuits. In this fashion there can be derived the filter circuit which is incorporated in the tube 40 shown in Fig. 3. As before, the tubular portion of the tube envelope serves as a base plate, along which extend two diametrically opposite linear arrays 41, 42, each of which includes the plurality of spaced conducting arms 43 from which are supported the annular elements 44 in a linear array. In tube 40, the linear arrays 41 and 42 correspond to the conducting supports 34 and 35 of tube 30 of Fig. 2. Alternate elements 44 are supported by arms of one of the two arrays, for forming an "intercircular" pattern, i. e., a pattern analogous to an interdigital pattern except that the interleaving elements are annular. The linear array of annular elements has a cylindrical configuration which preferably is coaxial with the cylindrical base plate and with the electron stream which is adjusted to flow contiguous thereto. Again, in general the same considerations of construction described hereinbefore are here applicable with the exception that in this case the circumference of the annular elements is preferably twice the length of the finger elements in the simple filter circuit illustrated in Fig. 1. In other respects the tube is operated in the manner set forth above.

It should be evident that this analysis may similarly be extended to four, six or any even number of systems arranged in parallel. However, if an odd number of systems are arranged in parallel and operation in the same phase is contemplated, the voltages of the free ends will not line up properly for permitting interconnection into a closed loop without altering the field distributions.

By way of example, Fig. 4 shows a tube 50 in which there is incorporated a parallel arrangement of four filter circuits as the wave transmission circuit. In this arrangement, there will be four longitudinal linear arrays 51, 52, 53 and 54, symmetrically disposed around the cylindrical base plate or tube envelope. Each array, as above, comprises a plurality of conducting supports 55 intgeral with and spaced along the base plate. Corresponding supports of the alternate arrays 51 and 53, 52 and 54, are in transverse alignment and form what, for the sake of convenience, will be designated transverse arrays, each transverse array comprising two support arms, one from each of alternate arrays 51 and 53, or in the other case, 52 and 54. Successive annular elements 56 will be supported from successive transverse arrays to form a linear array which has a cylindrical configuration, coaxial with the base plate and with the electron stream. In other respects the arrangement is similar to those described above, except that in this case the circumference of the annular elements will be four times the length ordinarily desirable for a finger element of the simple arrangement shown in Fig. 1.

It can be seen that certain generalizations can be made about the nature of such parallel filter circuit arrangements. In general, 2 N (where N is an integer) circuits may be combined by providing 2 N linear arrays of supporting arms symmetrically disposed around the axis of the cylindrical base plate, with successive supporting arms of each linear array arranged so that successive corresponding arms of alternate arrays are in transverse alignment to form transverse arrays. Successive annular elements can then be supported from such transverse arrays in an intercircular pattern.

Moreover, with reference to Figs. 2 and 3, it can be seen that if, instead of interconnecting the free ends of corresponding finger elements 61, 61A; 62, 62A; 63, 63A; etc. to form the successive annular elements 44, the various finger elements are first skewed with respect to one another and interconnection is thereafter made between the free ends of finger elements 61, 62A; 62, 63A; 63, 64A; 65, 66A; 66, 67A; etc., in place of an intercircular structure of annular elements, there can be derived a bifilar helical circuit, each helix thereof being supported along its length by a separate conducting support member. As with the annular loops, by increasing the number of original parallel circuits, multifilar helical configurations are possible.

It should be evident that the various arrangements which have been described are illustrative of the principles of the invention. Numerous other arrangements can be devised by one skilled in the art without departing from the spirit and scope of the invention.

What is claimed is:

1. In a microwave amplifier which employs the interaction between an electromagnetic wave and an electron stream to secure gain, an electron source and a target electrode spaced apart for defining therebetween a path of electron flow, a wave transmission circuit positioned along the path of electron flow for propagating a traveling wave in coupling relation with the electron flow comprising a conductive base plate, a plurality of conductive elements spaced apart in the direction of electron flow in a linear array, each of which is curved in a plane perpendicular to the direction of electron flow, and means forming a conductive path between said base plate and said curved conductive elements over only a minor portion of the length of the curved elements including two spaced conductive supports extending longitudinally along the base plate in the direction of electron flow and coupled for high frequency current flow to said base plate, adjacent elements of the linear array extending from a different one of the two supports in an interleaved pattern, input means for coupling electromagnetic waves to one end of the wave circuit, and output means for abstracting output waves from the other end of the wave circuit.

2. In a microwave amplifier which employs the interaction between an electromagnetic wave and an electron stream to secure gain, an electron source and a target electrode defining therebetween a path of electron flow, a wave transmission circuit positioned along the path of flow for propagating a traveling wave in coupling relation with the electron flow comprising a cylindrical base plate, a plurality of conductive elements spaced apart in the direction of electron flow in a linear array, each of which is curved in a plane perpendicular to the path of flow, and means forming a conductive path between said base plate and said curved conductive elements over only a minor portion of the length of the curved elements including two spaced conductive supports extending longitudinally along said base plate in the direction of electron flow and coupled for high frequency current flow to said base plate, adjacent elements of the array extending from a different one of the two conductive supports in an interleaved pattern and the plurality of elements having a cylindrical configuration coaxial with the cylindrical base plate, input means for coupling electromagnetic waves to one end of the wave circuit, and output means for abstracting wave energy from the other end of the wave circuit.

3. In a microwave amplifier which employs the interaction between an electromagnetic wave and an electron stream to secure gain, an electron source and a target electrode defining therebetween a path of flow, a wave transmission circuit positioned along the path of flow for propagating a traveling wave in coupling relation with the electron flow comprising a conductive cylindrical base plate, a plurality of conductive finger elements, each of which is curved in a plane perpendicular to the path of flow, and means forming a conductive path between said base plate and said curved conductive finger elements over only a minor portion of the length of said finger elements including two spaced conductive supports extending longitudinally along the base plate, adjacent elements of the linear array extending in an interdigital pattern from a different one of said two supports in paths which lie on a cylindrical surface coaxial with the cylindrical base plate, input means for coupling electromagnetic waves to one end of the wave circuit, and output means for abstracting output waves from the other end of the wave circuit.

4. In a traveling wave tube, means for producing an electron stream and for projecting said stream along a predetermined path, a wave transmission circuit positioned along the path of said electron stream for propagating a traveling wave in coupling relation with the electron stream comprising a cylindrical conductive base plate, a plurality of conductive finger elements spaced apart in a plurality of linear arrays, each finger element being curved in a plane perpendicular to the direction of the electron stream, and means forming a conductive path between said curved finger elements and the conductive base plate over only a minor portion of the length of the curved finger elements including a plurality of spaced conductive supports extending along said base plate in the direction of the electron stream and coupled to said base plate for high frequency current flow, each of the linear arrays including curved finger elements extending in an interdigital pattern from adjacent pairs of the plurality of spaced conductive supports, and the plurality of linear arrays lying on a cylindrical surface coaxial with the cylindrical base plate, input means for coupling electromagnetic waves to one end of the wave circuit, and output means for abstracting wave energy from the other end of the wave circuit.

5. In a microwave amplifier, means for forming an electron stream and for projecting said stream along a predetermined path, a wave transmission circuit positioned along the path of said stream for propagating a traveling wave in coupling relation with the electron stream comprising a cylindrical conductive base plate, a plurality of conductive annular elements spaced apart in the direction of electron flow in a linear array, and means forming a conductive path between said annular elements and said base plate over only a minor portion of the length of said annular elements including a plurality of conductive members supporting the annular members from the conductive base plate in an intercircular pattern, input means for coupling electromagnetic waves to one end of the wave circuit, and output means for abstracting output waves from the other end of the wave circuit.

6. In a microwave amplifier, an electron source and a target electrode defining therebetween a path of electron flow, a wave transmission circuit positioned along the path of flow for propagating a traveling wave in coupling relation with the electron flow comprising a conductive cylindrical base plate, a plurality of conductive annular elements spaced apart in the direction of electron flow in a linear array, each annular element being aligned coaxial with and spaced apart from the cylindrical base plate, and means forming a conductive path between said base plate and said annular elements over only a minor portion of the periphery of the annular elements including two linear arrays of spaced conductive supports conductively connected to and extending from said base plate, adjacent annular members being conductively connected with the supports of a different one of the two arrays in an intercircular pattern, input means for coupling electromagnetic waves to one end of the wave circuit, and output means for abstracting output waves from the other end of the wave circuit.

7. In a microwave amplifier, means for forming an electron stream and for projecting the electron stream along a predetermined path, a wave transmission circuit positioned along the path of said stream for propagating a traveling wave in coupling relation with said stream comprising a hollow cylindrical conductive base plate, a plurality of annular elements spaced apart along the path of electron flow in a linear array, the array extending in an axial direction within the hollow cylindrical base plate, and means forming a conductive path between said base plate and said annular elements over only a minor portion of the periphery of the annular elements including 2 N linear arrays of spaced conductive supports where N is an integer, said linear arrays being symmetrically disposed and extending along said hollow cylindrical base plate in the direction of electron flow, successive corresponding supports of each N alternate arrays forming transverse arrays, and alternate annular elements being conductively connected with a different one-half of said 2 N linear arrays in an intercircular pattern, input means for coupling electromagnetic waves to one end of the wave circuit, and output means for abstracting electromagnetic waves from the other end of the wave circuit.

8. In a device which utilizes the interaction between an electron stream and a traveling electromagnetic wave to amplify the wave, means forming an electron stream, and a wave transmission circuit for propagating a traveling wave in coupling relation with the stream comprising a hollow cylindrical conductive base member, a plurality of conductive finger elements aligned in a linear array in the direction of electron flow, each finger element being curved in a plane perpendicular to the electron flow and spaced apart over the major portion of its length from the base member and the array of finger elements defining a cylindrical envelope surface coaxial with said base member, means connecting one set of alternate members of the linear array to said conductive base member at points along a line parallel to the axis of said cylindrical base member, and means for connecting the other set of alternate members of said linear array to said conductive base member at points along a different line parallel to the axis of said cylindrical base member.

9. In a device which utilizes the interaction between an electromagnetic wave and an electron stream to amplify the wave, an electron source and a target electrode spaced apart for defining therebetween a path of electron flow, a traveling wave circuit positioned along said path of flow for propagating an electromagnetic wave in coupling relation with the electron flow comprising a conductive base plate, a plurality of conductive elements spaced apart longitudinally in a linear array spaced apart from the base plate, each element of which is curved in a plane perpendicular to the direction of electron flow, and means forming a conductive path between said base plate and said curved conductive elements over only a minor portion of the length of the curved members including two conductive support members spaced apart and extending longitudinally along the base plate in the direction of electron flow and coupled to said base plate for high frequency current flow, adjacent elements of the linear array extending from a different one of the two support members in an interleaved pattern, said wave transmission circuit being characterized in that the spacing between the base plate and the elements of the linear array is less than the mean separation between adjacent elements of the array, means for projecting an electron stream through said array at a velocity suitable for transferring energy to the propagating wave, and signal coupling means in energy transfer relation with said wave transmission circuit.

10. A device according to claim 9 for operation over a frequency band having a predetermined midband operating frequency in which the length of the conductive elements of the linear array is substantially a quarter wavelength at the midband operating frequency.

References Cited in the file of this patent

UNITED STATES PATENTS

| | | |
|---|---|---|
| 2,074,478 | Linder | Mar. 23, 1937 |
| 2,280,026 | Brown | Apr. 14, 1942 |
| 2,289,756 | Clavier et al. | July 14, 1942 |
| 2,289,952 | Zworykin | July 14, 1942 |
| 2,323,613 | Ludi | July 6, 1943 |
| 2,403,795 | Hahn | July 9, 1946 |
| 2,508,280 | Ludi | May 16, 1950 |
| 2,532,545 | Everhart | Dec. 5, 1950 |
| 2,567,339 | Ludi | Sept. 11, 1951 |
| 2,653,270 | Kompfner | Sept. 22, 1953 |